Aug. 2, 1949.  H. C. WAUGH  2,478,144
DEAERATING HEATING SYSTEM
Filed Feb. 15, 1944  3 Sheets-Sheet 1

Inventor
Harvey C. Waugh
by
Attorneys.

Witness:
Walter Lund.

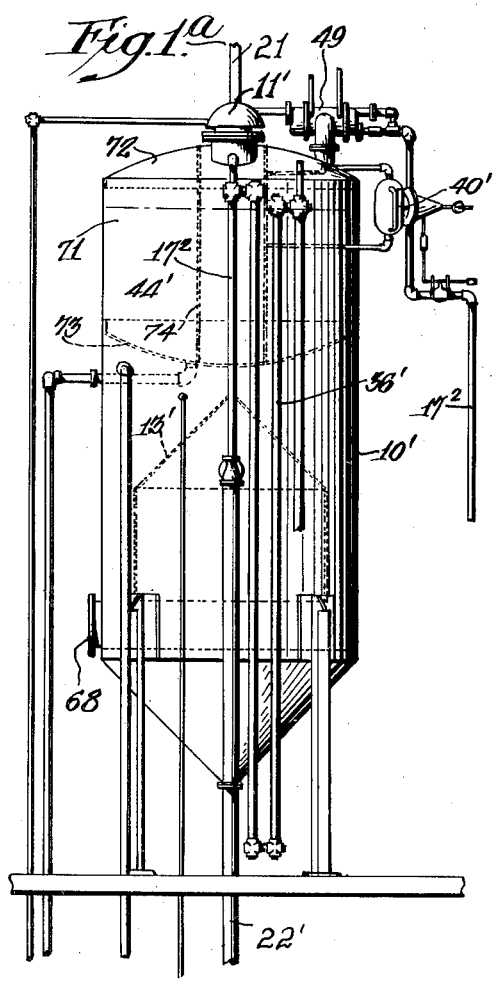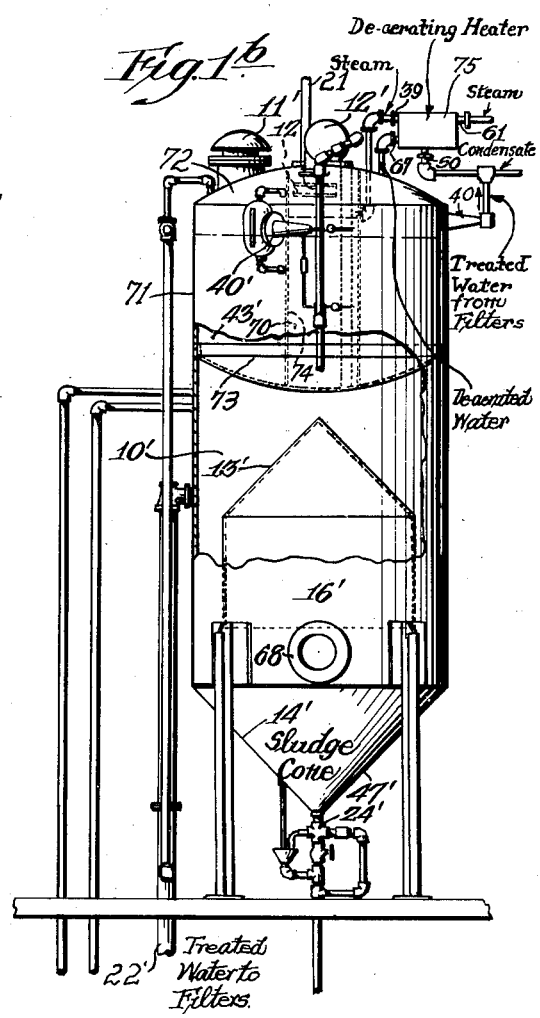

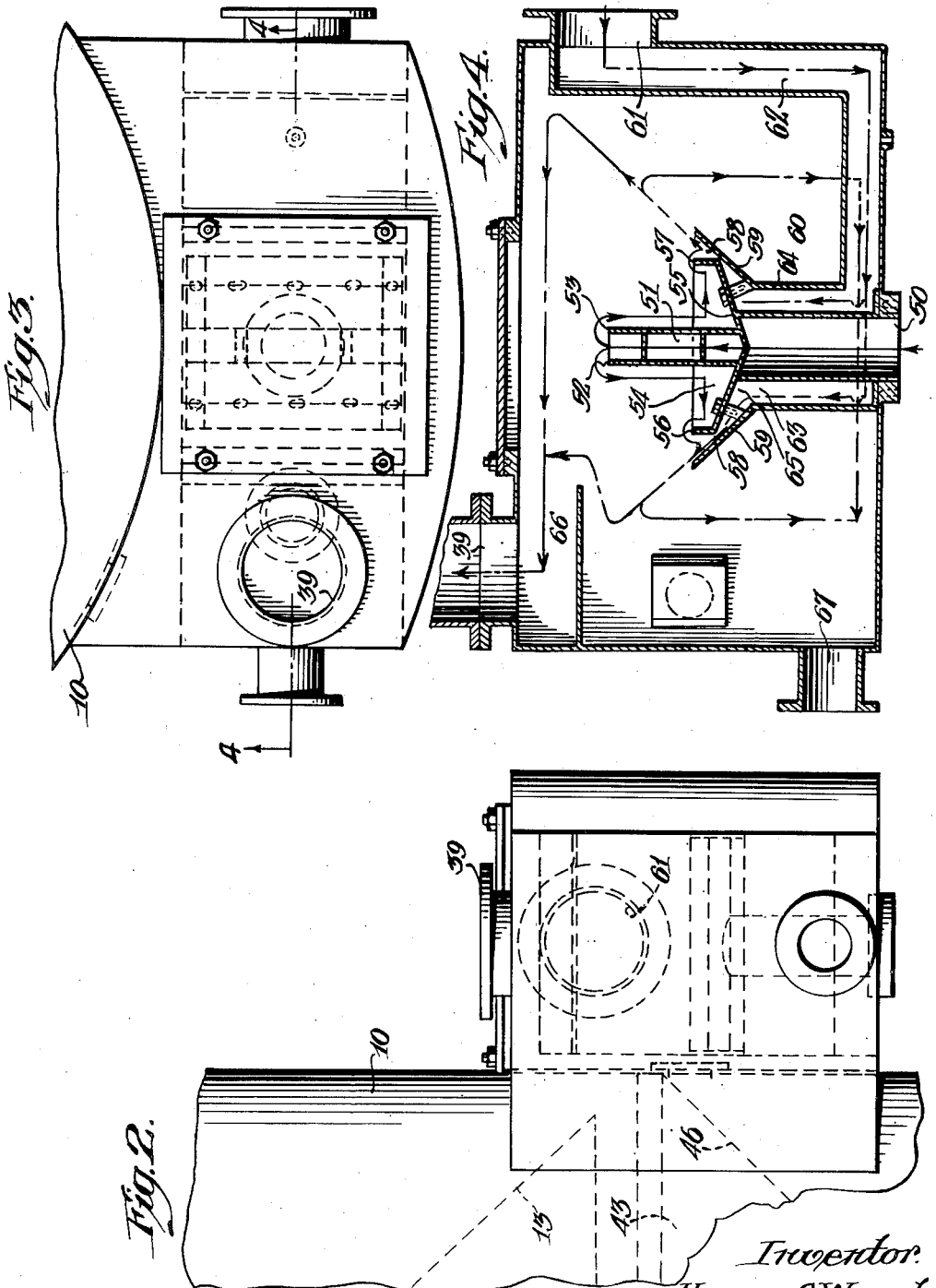

Patented Aug. 2, 1949

2,478,144

UNITED STATES PATENT OFFICE 2,478,144

DEAERATING HEATING SYSTEM

Harvey C. Waugh, Drexel Hill, Pa., assignor to American Water Softener Co., Philadelphia, Pa., a corporation of New Jersey Application February 15, 1944, Serial No. 522,517

15 Claims. (Cl. 210—14)

My invention relates to the art of hot process water softening of the de-aeration type and to the arrangement of the water softening, de-aeration and storage parts of such a hot process softener and de-aerator.

One of the purposes is to locate a de-aerating heater wholly outside of a treating tank and to return the de-aerated treated water to the tank, avoiding the complication caused by attempting to place the de-aerating heater within that part of the tank otherwise used for water softening. The de-aerated treated water may be stored beneath or above the space within which the water is treated, for example.

A further purpose is to store treated and de-aerated water in a compartment below a standard up-take cone and a sludge cone in a treating tank.

A further purpose is to store treated and de-aerated water in a compartment at the top of a treating tank.

A further purpose is to eliminate the various compartments and restrictions existing in the conventional type of hot water softener with de-aeration, particularly such conventional type softeners as have the de-aeration compartments and storage compartments located within the softener itself in the section in which the reaction and sedimentation ordinarily occur.

I have preferred to illustrate the invention by two main forms only, selecting forms which are practical, efficient, economical and inexpensive and which at the same time well illustrate the invention involved.

Figures 1a and 1b are elevations at right angles to each other showing another form of the invention. In Figure 1b, the outer wall is broken away to show the uptake cone and the doughnut formation.

Figure 2 is an enlarged side elevation of a part of Figure 1, showing chiefly the construction of the de-aerating heater.

Figure 3 is a fragmentary view of the de-aerating heater shown in Figure 2.

Figure 4 is a vertical central section of the particular type of de-aerating heater disclosed, with reference to the circulation of the treated water in this heater.

In the drawings similar numerals indicate like parts.

Figure 1:
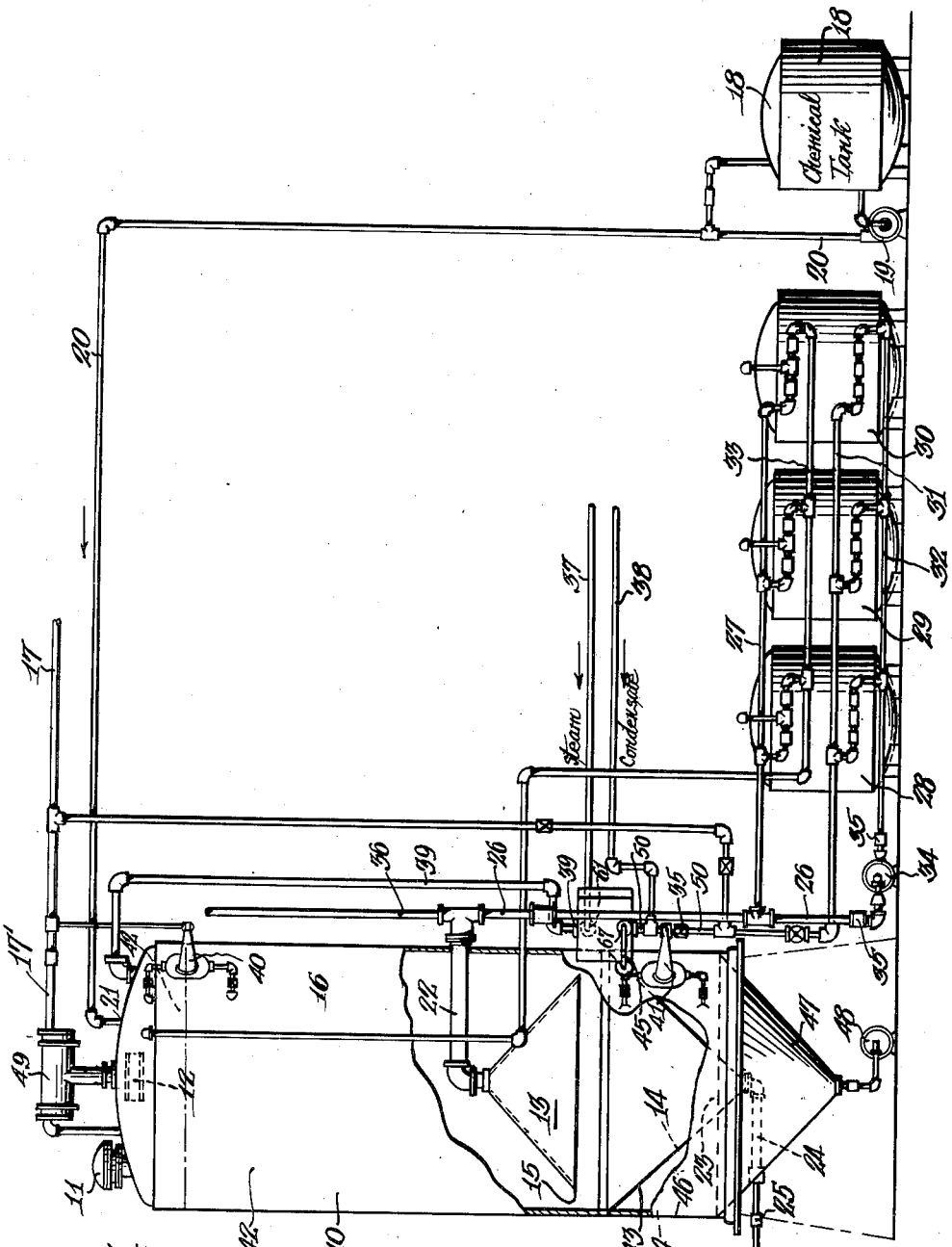
Figure 1 is a schematic view including a side elevation of a hot process softener and de-aerating heater providing a storage for the treated and de-aerated water, to show the relation between this apparatus and the rest of the structure required. The outer wall in Figure 1 is broken away to show the uptake cone.

The particular form of de-aerating heater selected is not per se applicant's invention and is not intended to be claimed in detail, except as it is claimed in association with the other parts of the apparatus. It is therefore to be understood that the de-aerating heater is being treated in this application as if it were a standard form of de-aerating heater connected into the system as is the present heater.

In the invention shown, a settling tank 10 is provided with the usual vacuum breaker 11 and heater 12 in the upper part, an uptake cone 13 near the bottom of the heater and a sludge cone 14 below the up-take cone. There is room for settling of the treated water downwardly past the edges 15 of the up-take cone and between them and the outer shell 16 of the settling tank.

Raw water enters through line 17, 17' and the heater as shown, and the chemicals are applied from a conventional outside chemical feeding equipment 18, pump 19 and line 20, delivering the treating liquid into the tank at any point 21 near to the raw water inlet.

The heater 12 heats the water to nearly the saturated exhaust steam temperature in the top of the settling tank, somewhat higher when the heater is supplied with a vent condenser than when it is not so supplied.

The water and chemicals pass down through the settling tank where reaction and settling out of sludge take place in the conventional manner, passing downwardly about the edge of the conventional up-take cone, up through the cone and out through the treated water discharge pipe 22. Meantime the sludge settles down into the sludge cone 14 and passes out through the bottom 23 of the sludge cone and pipe 24 controlled by blow-off valve 25.

From the discharge pipe 22 the treated water flows downwardly through a pipe line indicated at 26 into a filter influent 27 to a bank of filters 28, 29, 30 which may be any usual type of filters and which for present purposes are shown as supplied with filter effluents 31, backwash line 32 and backwash return 33 controlled by backwash pump 34.

The system as so far described and the balance of the system as hereinafter described is protected adequately by valves 35, by selected opening and closing of which the well known action of these parts is secured.

A fragmentary conventional overflow loop seal is shown at 36 and the backwash return is connected with the upper part of the settling tank 10 in case all the inlet water is raw water.

Steam line 37 and condensate line 38 connect with the de-aerating heater as elsewhere shown and from the de-aerating heater the steam is carried on to supply steam to the heater, effective through line 39. Suitable float controls 40 and 41 provide flow of water which shall maintain a proper pool 42 of water in the settling tank and pool 43 in the storage compartment 44 for treated and de-aerated water.

The de-aerating heater therefore receives steam, freely flowing condensate and filter effluent, the flow of the latter being float-controlled by the level of the storage water, and discharges its treated products at 45 into the de-aerated water storage compartment 44.

In order to effect economy in the space occupied by the de-aerated treated water, while maintaining full efficiency and heat economy, the de-aerated water storage pool 43 is located in Figure 1 beneath the sludge cone, using wall 46, a continuation of the outer wall 10 of the settling tank, as the outer cylindrical wall of the compartment for de-aerated water storage, using the sludge cone wall 14 for the upper limiting wall of this storage compartment and forming the lower limit of the storage compartment by a wall 47, which may be a mere bottom of whatever shape, but is shown as a conical wall.

The location of the compartment beneath the sludge cone has the advantage that the sludge and the storage tank are separated by a single wall only and that heat is conserved in the sludge and in the storage water. Each prevents loss of heat from the other along this common wall.

Storage water is drawn from the storage compartment through boiler feed pump 48.

It will be noted that the filters normally receive treated water, though water can be connected directly to the filters for backwash purposes.

The connections of the filters are regarded as conventional, the more important parts of the invention lying in de-aeration of treated and filtered water outside the softening tank and the storage of the de-aerated water in a compartment of the tank. I am able thus to divorce the de-aerated heater from its very general position within a compartment of the hot water softener containing storage of up-take treated water, to remove the up-take treated water from the settling tank to the heater, through filters, if desired, instead of storing much of it intermediately within the settling tank and to complete practically the entire treating operation, including permissible filtering, before the treated water is stored.

Any type of vent condenser 49 may be used if desired.

In the de-aerating heater shown, water enters through a pipe or conduit 50 which may carry condensate alone, or newly treated water alone, or both, and passes through channel 51 (Figure 4), whose sides 52, 53 it overflows into a pool 54 within tray or other receiver 55. It overflows the edges 56, 57 of the tray across a space 58 between this tray and the outer walls 59 of the space. The space and walls have lengths which may correspond with the length of the tray. Over the outer edges of these passages the water flows into the body 60 of the de-aerating heater.

The steam enters the de-aerating heater at 61 passes down through a channel 62 and then upwardly through an annular passage 63 comprising the space between the inlet pipe 50 and a surrounding pipe 64. The space may be coaxial with the pipe 50. However at the upper end 65 of the annular passage, the steam follows the under contour of the tray and the steam passes out to the upper part of the de-aerating heater through the spaces 58 between the steam inlet walls 64, 59 and the tray and thus through the thin stream of overflowing water, heating the water and at the same time taking air from the water.

The de-aerating heater is a thoroughfare heater that uses what is needed of the steam as supplied and passes its surplus steam on to the tank where the heat of the surplus is absorbed in the water being heated and treated. The steam fills all of the space within the de-aerating heater which is not filled by the water. The water level in the de-aerator may be set initially and controlled by that in the storage pool.

The surplus steam discharges through passage 66 and pipe 39 to and into the tank.

The chemically treated and filtered water which passes through the steam meantime falls in the bottom of the de-aerating heater and passes out through discharge opening 67 and pipe 45 which is connected into the storage space for de-aerated treated water.

The water in the heater must not flood the steam outlet through the falling water. The float control of inlet treated water protects against this. The quantity of condensate is not sufficient to require this control.

The structure of Figures 1a and 1b embodies the same principles as are applied in the form of Figure 1.

There are various differences between the two forms which will become evident from the description following; but it is still true that the treated water is taken out of the tank for de-aerating heating and is returned to the tank for storage, and that the storage within the tank not only conserves space and metal in the combination of the structure with the rest of the water treating apparatus, but that there is conservation of heat also in that one shell of the storage for de-aerated treated water is the same limiting wall as is used for the rest of the heater. The wall which is common not only need not be heat insulated but will be warmed by the water within the adjacent parts of the tank.

The steam enters the de-aerating heater in the same way as before and surplus steam is carried to the interior of the tank.

The tank 10' comprises an outer casing 16' containing primarily a treating chamber and a settling space along with an up-take cone 13', around whose edges there is room for settling of solid matter, and a sludge chamber. There is a manhole 68 which is above the sludge chamber.

Because it is preferred to keep down the height of the tank the treated water is withdrawn from a point 69 in the upper interior of the up-take cone rather than from above the cone. This treated water is drawn through pipe 22' and is passed as desired to suitable filters or other apparatus. Treating chemicals are introduced in the top of the tank at 21 from any suitable chemical supply chamber not shown. The raw water inlet is shown at $17^2$ and a conventional overflow loop seal 36' is seen.

Pipe 22' carries treated water to the filters. In general the connections are the same as those in the form of Figure 1 and the operation is the same but the storage compartment is differently placed and differently shaped.

The up-take cone 13' and the sludge cone 14' perform the same general functions as in Figure 1, but the storage for de-aerated treated water, though still within the main tank walls, is no longer below the sludge cone but is an annular compartment in the upper part of the tank.

The raw water and chemical treating materials are introduced through pipes corresponding to those in Figure 1 but pass through the central space 70 within the annular compartment 44'. Settlement takes place past the sides of the up-take cone with passage of sludge into sludge compartment.

The storage compartment 44' uses the outer upper wall 71 of the tank for its outer wall, the upper and lower annular walls 72, 73 for its upper and lower walls and a cylindrical wall 74 as its inner wall.

Water is withdrawn upwardly through the up-take cone and out through a side wall of a tank to the de-aerating heater shown at the top. It subsequently passes into the storage compartment 44' for de-aerated heated, and treated water. The same progress of the outlet water from the up-take cone through filters may be used as is shown in Figure 1, to be introduced into the de-aerating heater at the point marked "Treated water from filters" in Figure 1b. The de-aerating heater 75 is located outside the tank, preferablny high enough to drain into the annular storage compartment.

The same use of the de-aerating heater to receive treated water outside of the tank, to heat and de-aerate it and to return the de-aerated heated water to storage in a compartment of the tank in which treating has taken place is intended to be present in these views, 1a and 1b as in Figure 1 and it has therefore not been considered necessary to show the de-aerating heater other than to indicate its general location.

The differences between Figure 1 and Figures 1a and 1b are not only in the location of the de-aerating heater outside of the tank but also in the location and construction of the compartment used for storage of de-aerated heated treated water. Where not otherwise specifically named, corresponding parts have been indicated by the same reference characters as in Figure 1, using primes in Figures 1a and 1b.

In the second form there is the same purpose in mind as in the earlier described form, namely, to take chemically treated hot water from a chemical treating and settling compartment out of the tank of which the treating and settling compartment forms a part, further heat it and de-aerate it, and re-introduce the de-aerated heated water within another compartment of the tank, a storage compartment, where it is not only little in the way but where there may be a heat advantage in having one wall common to the storage water and to the heated but less highly heated body of treated water.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my claims.

Having thus described my invention what I claim as new and desire to secure by Letters Patent is:

1. In a de-aerating heating system, a tank having water in-take and steam in-take at the top and an up-take cone near the bottom, heating means in the upper part of the tank, walls forming a storage compartment having one wall of the tank as a common wall, a discharge from the up-take cone through the wall of the tank, a de-aerating heater outside of the outer wall of the storage compartment, a filter, connections from the up-take discharge through the filter to the de-aerating heater to provide water inlet thereto, condensate return connections to the heater, a discharge from the de-aerating heater to the storage compartment and a steam supply for the de-aerating heater at a point between the water inlet and the water discharge.

2. In a de-aerating heating system, a chemical tank, a mixing tank into which the chemical is fed, an up-take cone near the bottom of the mixing tank discharging laterally through said tank wall, a de-aerated water storage compartment in vertical line with the cone and within the mixing tank, a de-aerating heater outside said storage tank, connections from the up-take cone discharge supplying treated water to the de-aerating heater to provide water inlet thereto, a discharge pipe from the de-aerating heater into the storage compartment, steam line connections for the de-aerating heater at a point between the water inlet and the discharge pipe, and steam connections from the heater to the mixing tank.

3. In a water treating and de-aerating system, a chemical tank, a mixing tank, means for heating the water in the mixing tank, connections for supplying chemicals from the chemical tank to the mixing tank, a storage tank for de-aerated heated water within the outer walls of the mixing tank and having inner walls in common with walls holding heated mixture, walls forming an up-take cone passage in the lower part of the mixing tank, a discharge for treated water, passing through the walls of the mixing tank, a filter, a de-aerating heater outside the mixing tank and receiving as its inlet water to be de-aerated, the treated water from the mixing tank via the filter, a discharge from the de-aerating heater of de-aerated treated water into the storage for said water and a steam supply for the de-aerating heater at a point between the water inlet and the discharge.

4. In a tank, a treating chamber, connections for supplying chemicals to the treating chamber, a storage chamber in the tank having one wall in common with one wall of the treating chamber, a discharge for treated water from the treating chamber and a filter, in combination with a de-aerating heater outside of said tank, with which the discharge is connected via the filter to provide water inlet, discharge connections directing the de-aerated heated water to the storage chamber for de-aerated heated water and a source of steam supply for the heater at a point between the water inlet and the discharge connections.

5. In a de-aerating heating system, a tank having water inlet at the top and an up-take cone in the lower portion, heating means in the upper part of the tank, inlet for water softening chemicals into the upper part of the tank, a sludge cone in the lower part of the tank, walls forming a storage compartment having the sludge cone bottom wall as a common wall, walls forming a discharge of treated water collected by the up-take cone, through the wall of the tank, a de-aerating heater close to the outer wall of the storage compartment of the tank, connections from the up-take discharge to the de-aerating heater, a discharge from the heater of de-aerated water into the compartment and a steam supply for the heater at a point between the inlet connections and the discharge.

6. In a de-aerating heating system, a supply of chemicals for water treatment, a mixing tank into which the chemicals are fed, means for introducing into the mixing tank water to be treated in the lower portion of the tank, a discharge for chemically treated water passing from the up-take cone through the tank wall, a de-aerating water heater outside the tank and having an inlet connected with the discharge, a storage compartment within the tank, outlet connections from the de-aerating heater for passing water into the storage compartment, and a steam line for the de-aerating heater at a point between the inlet and the outlet.

7. In a de-aerating heating system, a supply of chemicals for treatment, a mixing tank into which the chemicals are fed, means for introducing into the mixing tank water to be treated, an up-take cone in the lower portion of the tank, a discharge for chemically treated water passing through the up-take cone and through the tank wall, a de-aerating water heater outside the tank and having an inlet connected with the discharge, a storage compartment within the tank, discharge connections from the de-aerating heater for passing water into the storage compartment, a steam line for the de-aerating heater, a steam supply for the heater at a point between the inlet connections and the discharge and steam connections from the steam discharge of the de-aerating heater to the mixing tank.

8. In a de-aerating heater system, a tank, means for introducing into the tank water to be treated, means for treating in-take water with a reagent within a treating chamber of the tank and for discharging it from the tank at the inlet of a de-aerating heater, a sludge cone at the bottom of the treating chamber, walls forming a de-aerated water storage compartment below and in line with the sludge cone, a de-aerating heater, connections for feeding to the compartment the treated water discharged into the de-aerating heater, steam supply for the de-aerating heater at a point between the inlet and the discharge and a steam supply from the de-aerating heater into the tank.

9. In a de-aerating heating system, a treating tank having an up-take cone near the bottom of the tank and a sludge cone below the up-take cone, means for introducing into the tank water to be treated, means for adding a reagent to the water to be treated, a storage compartment for de-aerated water below the up-take cone, filters, connections from the up-take cone to the influent of the filters, a de-aerating heater outside the tank, connections from the effluent of the filters to the inlet of the de-aerating heater, a discharge connection from the de-aerating heater to the compartment, steam connections for the heater at a point between the inlet and the discharge connection, and steam connections from the heater to supply surplus steam to the upper part of the tank.

10. In a water heating and de-aerating system, a chemical treating tank, means for adding chemicals to the water in the chemical treating tank, means for introducing into the tank water to be treated, an up-take cone near the bottom of the tank, a sludge cone beneath the up-take cone, a plurality of filters having influents and effluents, connections between the up-take cone and the influents of the filters, a de-aerating heater outside the tank, connections from the filter effluents to the inlet of the de-aerating heater, a storage compartment beneath the sludge cone and having heat-transferring connections with the cone, and discharge connections for delivering treated and de-aerated water from the de-aerating heater to the storage compartment beneath the sludge cone of the tank, steam connections for the de-aerating heater at a point between the inlet and the discharge connections, and connections for supplying surplus steam from the de-aerating heater to the top of the tank.

11. In a de-aerating heating system a cylindrical treating tank, a chemical treating mechanism for introducing chemicals to the water in the tank, a de-aerating heater outside the tank, connections supplying chemically treated water from the treating tank to the inlet of the de-aerating heater, discharge connections for the de-aerating heater, a steam supply for the de-aerating heater at a point between the inlet and the discharge connections, connections supplying steam to the upper part of the treating tank, walls in the upper part of the tank forming an annular bottom and cylindrical interior for an annular compartment using the outer walls of the treating tank as the outer walls of the storage tank, and raw water feed connections for the treating tank passing the water through the hollow interior of the annular compartment.

12. In a de-aerating heating system, a chemical tank, a mixing tank into which the chemical is fed, a raw water supply for the mixing tank, an up-take cone near the bottom of the mixing tank, walls forming a storage compartment for de-aerated heated water in the upper part of the mixing tank, a de-aerating heater outside of the mixing tank, connections for treated water collected by the up-take cone, passing through the treating tank wall, supplying water to the de-aerating heater, a discharge from the de-aerating heater into the storage tank for de-aerated water and filtering means for the treated water between the mixing tank and the de-aerating heater.

13. In a de-aerating heating system, a chemical tank, a mixing tank into which the chemical is fed, an up-take cone near the middle of the mixing tank, walls forming an annular storage space comprising the upper part of the mixing tank and having an interior wall and a lower wall in common with the mixing tank, a raw water supply, connections feeding the raw water supply to the mixing tank through the interior of the annular storage space, connections for passing chemically treated water through the outer wall of the mixing tank, a de-aerating heater, means for supplying chemically treated water from the up-take cone to the de-aerating heater, connections between the de-aerating heater and the annular space supplying de-aerated heated water from it to the storage space, a steam supply for the de-aerating heater at a point between the water supply to the heater and the connections from the de-aerating heater to the annular space, and connections between the de-aerating heater and the upper part of the mixing tank for passage of surplus steam.

14. In a de-aerating heating system, a tank, means for supplying to the tank water to be filtered, treated and de-aerated, a filter through which the water is passed, a chemical treating compartment in the tank to which the water is supplied, means for feeding chemicals to the treating compartment, an uptake cone within the treating compartment, a deaerating heater outside the tank receiving, deaerating and heating the treated water, means for passing chemically treated water through the filter to the de-aerating heater, a storage compartment within the tank to receive the de-aerated heated water and having one wall common with a wall of the chemical treating compartment, means for passing water from the de-aerating heater to the storage compartment and a steam line for the de-aerating heater at a point between the entrance of the chemically treated water to the heater and the water discharge therefrom.

15. In a de-aerating heating system, a tank, means for introducing into the tank water to be treated, walls forming a treating chamber within the tank, walls forming a storage chamber within the tank and having one wall in common with a wall of the treating chamber, a filter, means for supplying water to the filter from the treating chamber, means for chemically treating the water in the treating chamber, a de-aerating heater outside the tank, connections for supplying filtered water from the filter to the de-aerating heater, means for supplying steam for the heater at a point between the supply connections for water to the heater and the connections from the heater to the storage chamber and connections directing the de-aerated heated water to the storage chamber.

HARVEY C. WAUGH.

REFERENCES CITED

The following references are of record in the file of this patent:

UNITED STATES PATENTS

| Number | Name | Date |
|---|---|---|
| 1,119,008 | Gibson | Dec. 1, 1914 |
| 1,518,784 | Gibson | Dec. 9, 1924 |
| 2,047,291 | Rohlin | July 14, 1936 |
| 2,047,292 | Rohlin | July 14, 1936 |
| 2,168,584 | Rohlin et al. | Aug. 8, 1939 |
| 2,185,177 | Bates | Jan. 2, 1940 |
| 2,210,151 | Rohlin | Aug. 6, 1940 |
| 2,241,873 | Yoder | May 13, 1941 |
| 2,379,753 | Sebald | July 3, 1945 |

FOREIGN PATENTS

| Number | Country | Date |
|---|---|---|
| 305,848 | Great Britain | Feb. 14, 1929 |
| 360,384 | Great Britain | Apr. 28, 1930 |